US008788502B1

(12) United States Patent
Hensel et al.

(10) Patent No.: US 8,788,502 B1
(45) Date of Patent: Jul. 22, 2014

(54) ANNOTATING ARTICLES

(75) Inventors: Chase Hensel, San Francisco, CA (US);
Jayakumar Hoskere, Bangalore (IN);
Rohit Ananthakrishna, Bangalore (IN)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 13/191,345

(22) Filed: Jul. 26, 2011

(51) Int. Cl.
*G06F 7/00* (2006.01)
*G06F 17/30* (2006.01)

(52) U.S. Cl.
USPC ........................................ 707/738

(58) Field of Classification Search
CPC .......... G06F 17/30705; G06F 17/3061; G06F 17/30719
USPC ........................................ 707/738
See application file for complete search history.

(56) References Cited

U.S. PATENT DOCUMENTS

| 7,231,405 | B2 * | 6/2007 | Xia ............................... 1/1 |
| 7,568,148 | B1 * | 7/2009 | Bharat et al. ................. 715/200 |
| 7,814,089 | B1 * | 10/2010 | Skrenta et al. ............... 707/709 |
| 2003/0046311 | A1 * | 3/2003 | Baidya et al. ................ 707/200 |
| 2007/0112774 | A1 * | 5/2007 | Cheshire ........................ 707/9 |
| 2008/0033652 | A1 * | 2/2008 | Hensley et al. ................. 702/5 |
| 2009/0063646 | A1 * | 3/2009 | Mitnick ...................... 709/206 |
| 2009/0276429 | A1 * | 11/2009 | Curtiss et al. .................. 707/7 |
| 2012/0101965 | A1 * | 4/2012 | Hennig et al. ................ 706/12 |

* cited by examiner

*Primary Examiner* — Fred I Ehichioya
*Assistant Examiner* — Kris Mackes
(74) *Attorney, Agent, or Firm* — Harrity & Harrity, LLP

(57) ABSTRACT

A server may receive an article that is retrieved from a server; determine whether the article satisfies first criteria based on content of the first article; annotate the article with a first article type when the article satisfies the first criteria; determine whether the article satisfies second criteria based on information associated with the article; annotate the article with a second article type when the article satisfies the second criteria; and store the article in association with a topic and at least one of the first article type or the second article type. The different server may be associated with a news website.

21 Claims, 10 Drawing Sheets

US 8,788,502 B1

ANNOTATING ARTICLES

BACKGROUND

The World Wide Web ("web") contains news articles provided by different news sources. Search engines assist users in locating desired articles by cataloging articles posted on web sites of the news sources. Typically, in response to a user's request to find articles related a particular current events topic, the search engine returns references to articles that reference the particular current events topic. Usually, the user has to click through to multiple articles and browse/read at least a portion of each one of the multiple articles before identifying an article of a type that the user is interested in reading/locating. As a result, users expend time and effort before identifying articles of particular types.

SUMMARY

According to one aspect, a method may include: identifying, by at least one of the one or more server devices, an article about a topic; determining, by at least one of the one or more server devices, a set of geographic locations for the article; determining, by at least one of the one or more server devices, a source of the article; determining, by at least one of the one or more server devices, a geographic location associated with the source of the article; determining, by at least one of the one or more server devices, whether the geographic location, of the source of the article, is included in the set of geographic locations; and specifying, by at least one of the one or more server devices, a type, of the article, as a particular type when the geographic location, of the source of the article, is included in the set of geographic locations. The set of geographic locations may include one or more geographic locations mentioned in the article. The particular type may specify that the article is related to the geographic location.

According to another aspect, a computer-readable medium, that includes instructions executable by at least one processor, may include one or more instructions to: receive a first article that is retrieved from a first server; determine whether the first article satisfies first criteria based on content of the first article; annotate the first article with a first article type when the first article satisfies the first criteria; determine whether the first article satisfies second criteria based on information associated with the first article; annotate the first article with a second article type when the first article satisfies the second criteria; and store the first article in association with the topic and at least one of the first article type or the second article type. The first server may be associated with a first news website.

According to yet another aspect, a server device may include a memory and a processor. The memory may store articles. The processor may receive a search query; select a first article, of the articles, that is responsive to the search query and is stored in association with a first particular article type that describes content of the first article; select a second article, of the articles, that is responsive to the search query and is stored in association with a second particular article type that describes a type of the second article; generate an annotated result based on the first article and the second article; and provide the annotated result for display on the user device. The first particular article type may be different from the second particular article type. The annotated result may include a first link to the first article, a first visual indicator that identifies the first particular article type, a second link to the second article, and a second visual indicator that identifies the second particular article type.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

An article is one or more documents that include information about a particular topic, including a current event. A news source (e.g., Example Times) may provide the article via a web site (e.g., www.example.com). A document may include, for example, an e-mail, a web page, a business listing, a file, a combination of files, one or more files with embedded links to other files, a news group posting, a blog, an advertisement, an image, a video, a digital map, etc.

A user may include one or more people (e.g., a person, a group of people that may have some relationship (e.g., people associated with a business or organization), or a group of people with no formal relationship).

An implementation described herein may provide a user with an ability to make an informed decision regarding a news article. This decision can be based on information, included in an annotated search result identifying the news article. An annotation server may annotate an article with one or more article type(s) based on content of the article and/or other information related to the article. The annotation server may receive a search query, entered at a user device, and optionally a location of the user device. The annotation server may select articles that are responsive to the search query and have been annotated, and are stored in association, with particular article types. The annotation server may select one or more articles for each one of the particular article types. The annotation server may generate an annotated result. The annotated result may include, for each one of the selected articles, a links to a selected article and a visual indicator based on the article type of the selected article. The annotated result may assist a user in identifying one of the selected articles that the user is interested in reading/locating.

Figure 1:
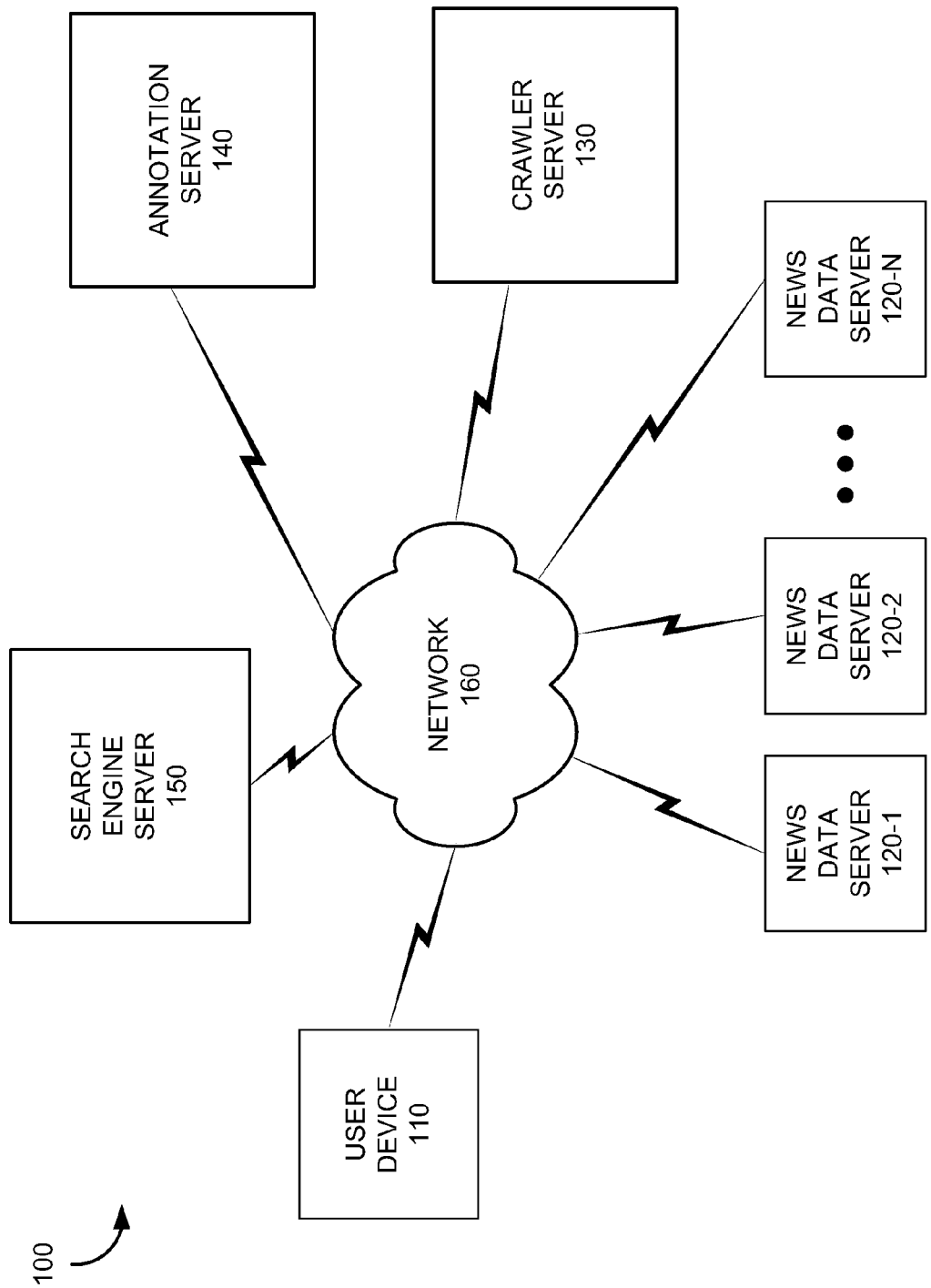
FIG. 1 is a diagram of an example environment in which systems and/or methods described herein may be implemented.

FIG. 1 is a diagram of an example environment 100 in which systems and/or methods described herein may be implemented. Environment 100 includes a user device 110, news data servers 120-1, 120-2, ..., 120-N (collectively referred to as "news data servers 120" and individually as "news data server 120"), a crawler server 130, an annotation server 140, a search engine server 150, and a network 160. In practice, environment 100 may include additional components, fewer components, different components, or differently arranged components than are shown in FIG. 1. In some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with search engine server 150 via network 160. In one implementation, user device 110 may take the form of a web service terminal, a personal computer, a laptop, a handheld computer, a smart phone, a mobile telephone device, a personal digital assistant (PDA), a personal media player, a set-top box (STB) connected to a video display device (e.g., a television), or any other type of computation or communication device capable of transmitting data to search engine server 150. In another implementation, user device 110 may represent multiple devices operated by a user, including, for example, a personal computer and a mobile device.

News data server 120 may include any computation or communication device, such as a communication device that is capable of communicating with user device 110 and/or crawler server 130. News data server 120 may store or maintain articles that may be browsed by a user of user device 110, or may be crawled by crawler server 130. Such articles may include documents related to published news stories, opinion articles, summaries of news stories, magazine articles, blog entries, images, or any other type of data. For example, news data server 120 may store or maintain news stories from any type of news source, such as, for example, a national newspaper, a local newspaper, an international newspaper, a weekly magazine, a sports news network, a celebrity news blog, a satirical newspaper/website, local news websites, opinion-based blogs, etc. In another implementation, news data server 120 may store or maintain data related to other types of web documents, such as pages of web sites (e.g., web content).

Crawler server 130 may include any computation or communication device, such as a communication device that is capable of communicating with news data servers 120 and/or annotation server 140. Crawler server 130 may include one or more hardware and/or software components that access, fetch, index, search, and/or maintain documents/articles. Crawler server 130 may implement a data aggregation service by crawling a corpus of documents (e.g., web pages) hosted on news data servers 120, indexing the documents, and storing information associated with these documents in a repository of crawled documents. For example, crawler server 130 may send a request to news data server 120 for a document and download the entire document. Crawler server 130 may extract text from documents retrieved from news data server 130. Crawler server 130 may transmit the text, as an article, to annotation server 140.

The aggregation service may be implemented in other ways, such as by agreement with the operators of news data servers 120 to distribute their documents via the data aggregation service. Operators of news data servers 120 may request an operator of crawler server 130 for crawler server 130 to retrieve articles/documents from news data servers 120. Crawler server 130 may maintain a list of news sources associated with news data servers 120, and fetch articles/documents only from news data servers 120 of the news sources included in the list.

Annotation server 140 may include any computation or communication device, such as a communication device that is capable of communicating with crawler server 130 and/or search engine server 150. Annotation server 140 may receive, annotate, store, search, and/or maintain articles. Annotation server 140 may receive articles from crawler server 130. Annotation server 140 may annotate an article with one or more article types based on content of the article, the source of the article, and/or any other information associated with the article. The content and/or the information associated with the article may include a link to the article, a source of the article, HyperText Markup Language (HTML) used by news data server 120 to provide the article to user device 110, etc. Herein, HTML may refer to HTML tags and information between the tags. Annotation server 140 may store (e.g, index) an article in association with a topic of the article and the article type(s) with which the article is annotated.

Furthermore, annotation server 140 may generate an annotated result, based on the stored articles, in response to a request from search engine server 130. The annotated result may include a listing corresponding to one or more articles. Each entry of the listing may include a link to an article and an indicator based on one or more article type(s) associated with the article. Annotation server 140 may provide the annotated result to search engine server 130 and/or directly to user device 110.

Search engine server 150 may include any computation or communication device, such as a communication device that is capable of communicating with user device 110 and/or annotation server 140. Search engine server 150 may receive a search query from user device 110. Search engine server 150 may transmit a request, based on the search query, to annotation server 140. The request may include the search query and a geographic location (e.g., address, country, zip code, etc.) of user device 110. In some implementations, search engine server 150 may use information regarding the geographic location of user device 110 only with the permission of a user of user device 110, for example, through an opt-in or opt-out mechanism.

Search engine server 150 may receive the annotated result from annotation server 140. Search engine server 150 may provide the annotated result to user device 110. User device 110 may display the annotated result in, for example, a browser window.

Network 160 may include a single network, multiple networks of a same type, or multiple networks of different types. For example, network 160 may include one or more of: a direct connection between devices/components, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, or any combination of the aforementioned networks. Furthermore, any direct connection, shown in FIG. 1 between components of environment 100, may include/represent connections via network 160.

Figure 2:
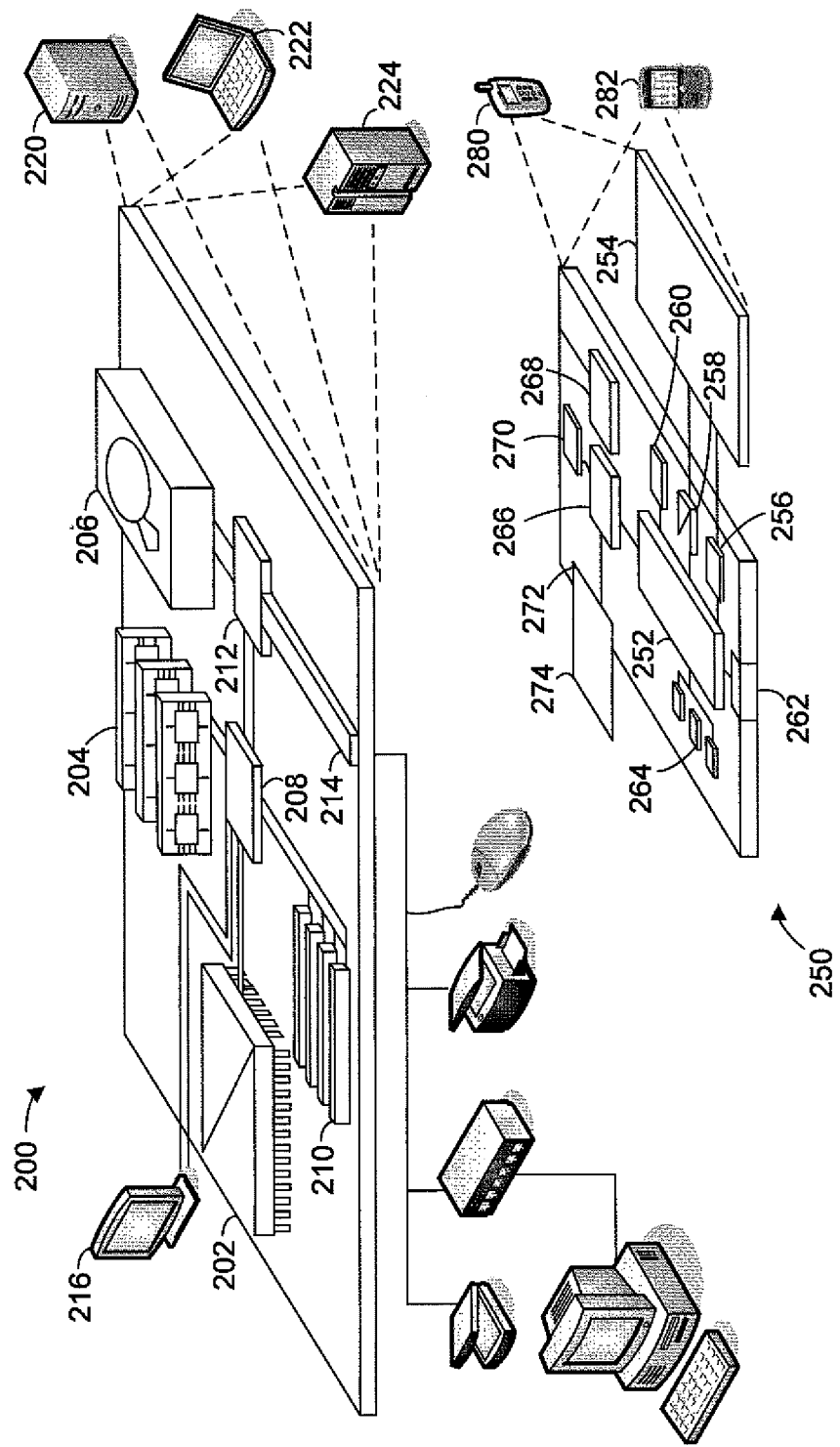
FIG. 2 illustrates an example of a computing device and a mobile computing device.

FIG. 2 is a diagram that shows an example of a computing device 200 and a mobile computing device 250, which may be used with the techniques described herein. Computing device 200 may correspond to, for example, user device 110, news data server 120, crawler server 130, annotation server 140, and/or search engine server 150. For example, each of user device 110, news data server 120, crawler server 130, annotation server 140, and/or search engine server 150 may include one or more computing devices 200. Mobile computing device 250 may correspond to, for example, user device 110.

Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In another implementation, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system, etc.).

Memory 204 may store information within computing device 200. In one implementation, memory 204 may include a volatile memory unit or units. In another implementation, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In one implementation, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In one implementation, high-speed controller 208 may be coupled to memory 204, display 216 (e.g., through a graphics processor or accelerator), and to high-speed expansion ports 210, which may accept various expansion cards (not shown). In the implementation, low-speed controller 212 may be coupled to storage device 206 and to low-speed expansion port 214. Low-speed expansion port 214, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device (not shown), such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a microdrive or other device (not shown), to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a TFT LCD (Thin-Film-Transistor Liquid Crystal Display), an OLED (Organic Light Emitting Diode) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a SIMM (Single In Line Memory Module) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided via SIMM cards, along with additional information, such as placing identifying information on a SIMM card in a non-hackable manner.

Memory 264 and/or expansion memory 274 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, a personal digital assistant (not shown), and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
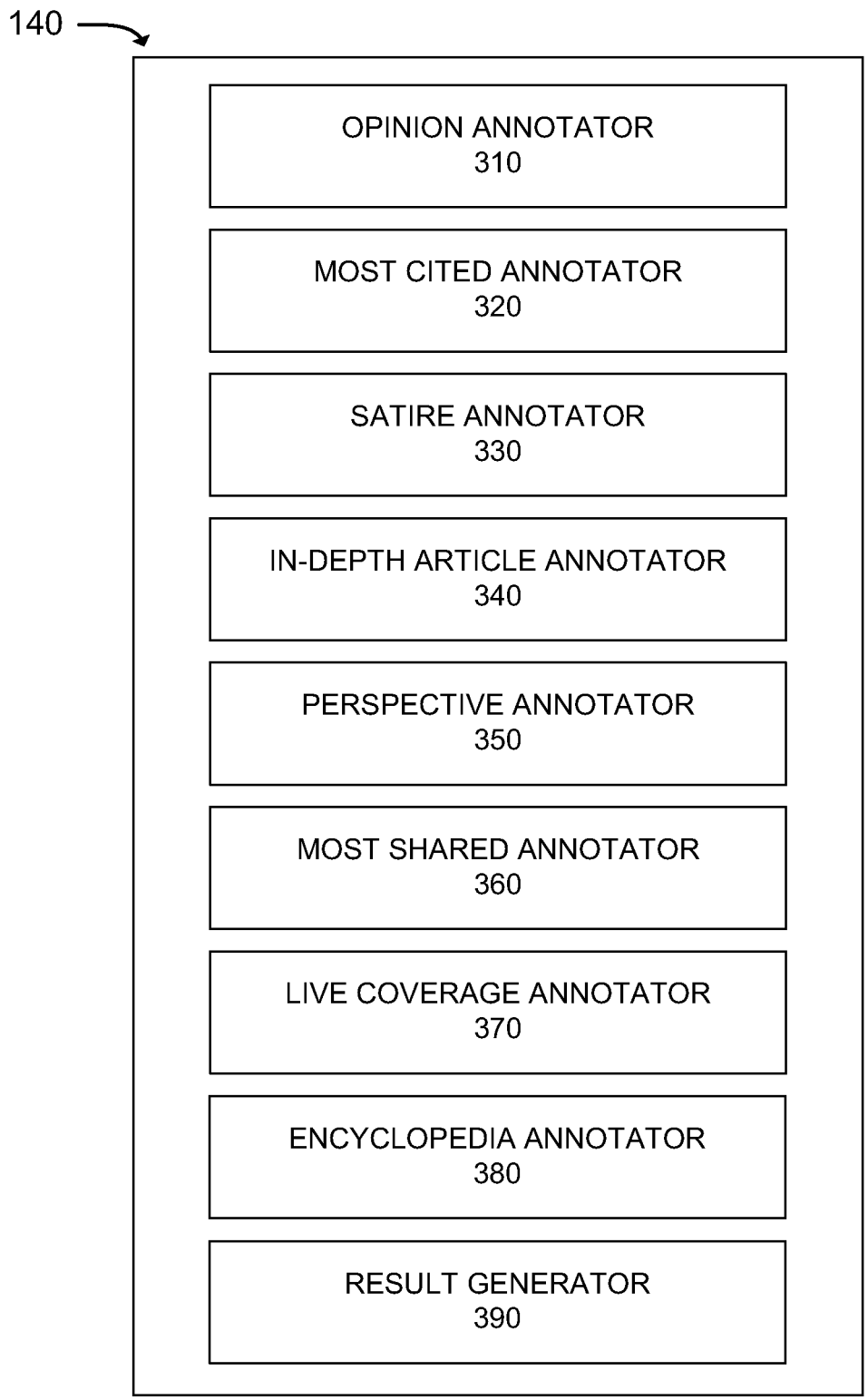
FIG. 3 is a diagram of example functional components of an annotation server of FIG. 1.

FIG. 3 is a diagram of example functional components of annotation server 140. As shown in FIG. 3, annotation server 140 may include one or more of the following components: an opinion annotator 310, a most cited annotator 320, a satire annotator 330, an in-depth article annotator 340, a perspective annotator 350, a most shared annotator 360, a live coverage annotator 370, an encyclopedia annotator 380, and/or a result generator 390. In one implementation, the functions described in connection with FIG. 3 may be performed by one or more components of computing device 200 (FIG. 2) or one or more computing devices 200. In another implementation, one or more components of annotation server 140 may represent a group of computing devices dedicated to performing function(s) associated with a particular functional component. Annotation server 140 may receive an article and/or information associated with the article from crawler server 130.

Opinion annotator 310 may annotate an article with an opinion type when the article satisfies criteria for being an opinion article. An opinion article may include an opinion expressed by one or more authors of the article (e.g., a blog entry, an editorial, a column written by a columnist, an opinion article written by an opinion page writer, an opinion article written by a contributing writer, etc.). Opinion annotator 310 may determine whether an article satisfies the criteria for being an opinion article based on information associated with the article. In one implementation, the information may include one or more of: a title of the article, a link (e.g., a uniform resource identifier (URI)) associated with the article, and/or HTML associated with the article. For example, the criteria may require for the title, the link, and/or the HTML to include one or more terms indicative of an opinion article, such as "Editorial," "Columnist," "Column," "Opinion," "Op-Ed," and/or one or more other terms that indicates that the article is an opinion article.

Most cited annotator 320 may annotate an article with a most cited type when the article satisfies criteria for being a most cited article. The article may satisfy the criteria for being the most cited article when the article is cited more than any other article about same topic as the article. An example process for determining when an article is a most cited article is described below with reference to FIG. 5.

Satire annotator 330 may annotate an article with a satire type when the article satisfies criteria for being a satire article. In one implementation, one or more operators of news data servers 120 may indicate that particular news data servers 120 only store articles that are satire. Satire annotator 330 may add names of sources associated with those particular news data servers 120 to a list of sources associated with the satire type. Satire annotator 330 may determine a source of an article received from crawler server 130. The article may satisfy the criteria for being a satire article when the source of the article is on the list of sources associated with the satire type.

In another implementation, satire annotator 330 may determine that an article satisfies the criteria for being a satire article based on a title of the article, a link associated with the article, and/or HTML associated with the article. For example, the criteria may require for the title, the link, and/or the HTML to include one or more terms indicative of a satire, such as "Humor," "Satire," "Parody," and/or one or more other terms that indicate that the article is a satire article.

In-depth article annotator 340 may annotate an article with an in-depth type when the article satisfies criteria for being an in-depth article. In one implementation, the article may satisfy the criteria for being an in-depth article when a length of the article is greater than, by a particular margin (e.g., 0%, 20%, etc.), an average length of other articles about the same topic as the article. An example process for determining when an article is an in-depth article is described below with reference to FIG. 6.

Perspective annotator 350 may indicate that an article is from a local perspective or an international perspective based on a geographic location of user device 110. To do so, perspective annotator 350 may, first, annotate an article with a local-to-story type when a geographic location of a source of the article matches (e.g., is equal to) a geographic location mentioned one or more times in the article. The local-to-story type may indicate that the article is from the source that is local to a geographic location of the story described in the article.

Search engine server 150 may determine the geographic location of user device 110 based on an IP address associated with user device 110. Annotation server 140 may receive, from search engine server 150, the geographic location of user device 110 with a search query. Perspective annotator 350 may indicate that the article is from a local perspective when the article is annotated with the local-to-story type and the geographic location of the source of the article matches the geographic location of user device 110. Perspective annotator 350 may indicate that the article is from an international perspective when the article is annotated with the local-to-story type and the geographic location of the source of the article is different from the geographic location of user device 110. An example process for indicating when an article is from a local perspective or an international perspective is described below with reference to FIG. 7.

Most shared annotator 360 may annotate an article with a most shared type when the article satisfies criteria for being a most shared article. Most shared annotator 360 may retrieve one or more different quantities of times that an article, about a particular topic, is shared by particular users of one or more online applications. Most shared annotator 360 may generate/calculate a score based on the one or more different quantities of times. For example, the score may equal one, or an average, of the one or more different quantities of times. The article may satisfy the criteria for being a most shared article when the score calculated for the article is greater than a similar score calculated for any other article about the particular topic. For example, the article may satisfy the criteria when a quantity of times that the article is shared is greater than a quantity of times that any other article about the particular topic is shared.

The particular users may include one or more of: any users of one or more particular online applications, users who are related, via one or more online applications, to a user of user device 110, users who are located in the same geographic area as a geographic location of user device 110, and/or any other group of users who are grouped based on characteristics associated with the users, one or more online applications, and/or the user of user device 110. The online applications may include one or more of: a social networking service, a blogging service (e.g, microblogging service), or a messaging service (e.g., instant messaging, e-mail, etc.).

For example, most shared annotator 360 may retrieve a quantity of times that the article was shared by users of a particular microblogging service from a server of the particular microblogging service or from an intermediary server. The intermediary server may collect information regarding quantities of times that different articles are shared from operators of different online applications, including the particular microblogging service, and/or from operators of news data servers 120. In some implementations, the information regarding the quantities is publicly available.

In another example, most shared annotator 360 may retrieve a quantity of times that the article was shared by particular users, via one or more online applications, from operator(s) of the one or more online applications and/or from the intermediary server. The particular users may include users with whom the user of user device 110 has indicated a connection (e.g., friends of the user, professional associates of the user, people (e.g., celebrities, experts, etc.) who the user is interested in, etc.). In some implementations, the quantity of times that the article was shared by particular users is publicly available.

Live coverage annotator 370 may annotate an article with a live coverage type when the article satisfies criteria for being a live coverage article. A live coverage article may include information about an ongoing event. One or more authors of the live coverage article may update contents of the article based on what happens during the ongoing event. Live coverage annotator 370 may determine whether an article satisfies the criteria for being a live coverage article based on information associated with the article. The information may include one or more of: contents of the article, a title of the article, a link associated with the article, and/or HTML associated with the article. For example, the criteria may require for the title, the link, and/or the HTML to include one or more terms indicative of an ongoing event, such as "Live," "Live:," "Live From," "Live Report," "Live Coverage," and/or one or more other terms that indicate that the article is a live coverage article. These terms can be selected and stored, for example, in a whitelist that the live coverage annotator 370 uses to determine whether an article satisfies the criteria for being a live coverage article.

Encyclopedia annotator 380 may annotate an article with a name of a particular online (e.g., web-based) encyclopedia when an entry of the particular online encyclopedia refers to the article. For example, the entry of the particular may refer to the article by citing the article and/or by providing a link to the article. An annotated result based, in part, on the article, which is annotated with the name of the particular online encyclopedia, may include a link to the entry, of the particular online encyclopedia, that refers to the article.

Result generator 390 may generate an annotated result in response to a request from search engine server 150. The request may include a search query entered by a user of user device 110 and a geographic location of user device 110. Result generator 390 may identify (indexed) articles associated with a particular topic based on the search query. Result generator 390 may select one or more of the identified articles about the topic that are annotated with one or more particular article types. Result generator 390 may select a particular quantity of articles (e.g., 1) for each one of the particular article types. For example, result generator 390 may select one opinion article that is annotated with an opinion type, two local-to-story articles that are annotated with a local-to-story type, and one article that is annotated with a name of a particular online encyclopedia.

Result generator 390 may generate the annotated result based on the selected articles. The annotated result may include an entry for each one of the selected articles. Each entry may include a link to one of the selected articles and an indicator based on the article type(s) with which the one of the selected articles is annotated. For example, when the article type is a local-to-story type, result generator 390 and/or perspective annotator 350 may determine the indicator based on the article type and the geographic location of user device 110, as described further below with reference to FIG. 7.

Figure 4A:
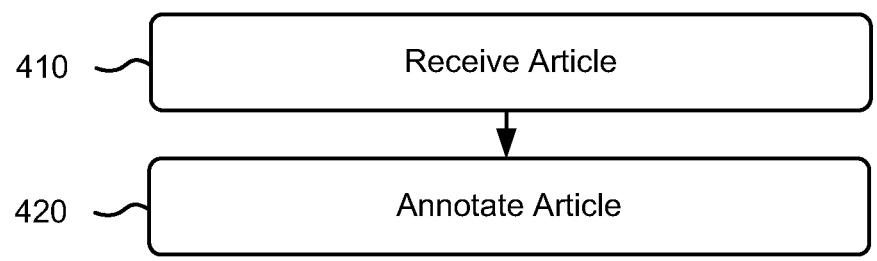
FIG. 4A is a flowchart illustrating an example process for annotating an article.

FIG. 4A is a flowchart illustrating an example process 400 for annotating an article. In one implementation, annotation server 140 may perform process 400. In other implementations, one or more other devices, separate from, or in combination with, annotation server 140, may perform some or all of process 400.

As shown in FIG. 4A, process 400 may include receiving an article (block 410). For example, crawler server 130 may retrieve one or more documents associated with an article from news data server 120. The documents may correspond to web page(s) that an operator of news data server 120 posted/added to a website associated with news data server 120 within a predefined period of time (e.g., 24 hrs, 1 hr, etc.). Crawler server 130 may extract content (e.g., text, link, HTML, etc.) from the documents and transmit the content, with other related information, as an article to annotation server 140. Annotation server 140 may receive the article and any other related information (e.g., metadata, such as source, author, article length, language, etc.).

The article may be annotated (block 420). For example, annotation server 140 may determine topic(s) associated with an article based on how the documents associated with the keywords used to index the article (e.g., by crawler server 130) Annotation server 140 may transmit the article, along with other information (if needed), to one or more annotators. In one implementation, annotation server 140 may determine what information is needed by a particular annotator (e.g., opinion annotator) and only transmit that information (e.g., content, title, link, and/or HTML) to the particular annotator. Each one of annotators may annotate the article with a particular article type (e.g., an annotation) when the article satisfies particular criteria. Annotation server 140 may store the article in association with the topic(s) and the article type(s), if any, with which the article is annotated. Annotation server 140 may simultaneously and/or continuously receive numerous articles (block 410) and annotate the articles with different article types (block 420).

Figure 4B:
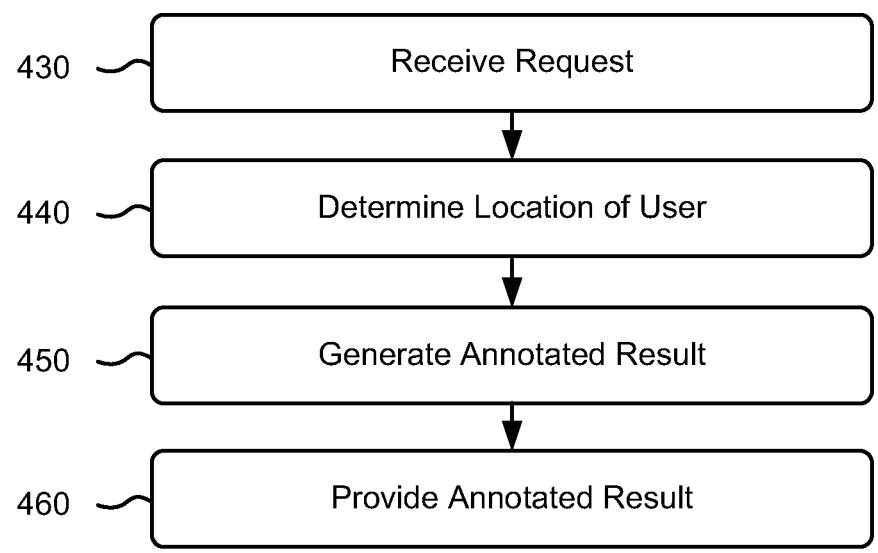
FIG. 4B is a flowchart illustrating an example process for providing an annotated result.

FIG. 4B is a flowchart illustrating an example process 405 for providing an annotated result. In one implementation, annotation server 140 may perform process 400. In other implementations, one or more other devices, separate from, or in combination with, annotation server 140, may perform some or all of process 400.

As shown in FIG. 4B, process 405 may include receiving a request (block 430). For example, a user, of user device 110, may use a browser to open a web search engine interface that is used, for example, to find news articles. The user may enter a search query into the search engine. Search engine server 150 may receive the search query. Search engine server 150 may determine a geographic location of user device 110 when permitted by the user. Search engine server 150 may generate a request based on the search query and the geographic location. The request may include the search query and information regarding the geographic location. Annotation server 140 may receive the request from search engine server 150.

A location of the user may be determined (block 440). For example, in one implementation, annotation server 140 may determine a geographic location of the user based on a geographic location included in the request. In another implementation, annotation server 140 may determine the location of the user based on other types of information included in the request (e.g., an Internet Protocol (IP) address of user device 110). In yet another implementation, annotation server 140 may request a geographic location of user device 110, and/or the other information, from search engine server 150 after receiving the request. The location may include a name of a country, an address, a zip code, or a numerical representation of geographic coordinates associated with the location. As explained above, in some implementations, annotation server 140 may collect information regarding the location of the user only with the user's permission.

An annotated result may be generated (block 450). For example, annotation server 140 may identify articles responsive to the search query Annotation server 140 may select one or more of the articles that are stored in association/annotated with particular article types. In another implementation, annotation server 140 may select based on rules for selecting.

In one implementation, annotation server 140 may select, based on the rules, a different particular quantity of articles (e.g., 1, 3) for each one of one or more particular article types. For example, annotation server 140 may select, based on the rules, one article that is annotated with a most cited type, three articles that are annotated with an opinion type, two articles that are annotated with a local-to-story type, etc. In another implementation, for example, annotation server 140 may select, based on the rules, only an article that is annotated with a particular type, if available. If the article that is annotated with the particular type is not available, annotation server 140 may select, based on the rules, one or more articles annotated with one or more other particular article types.

Annotation server 140 may generate an annotated result based on the selected articles and the geographic location of the user. The annotated result may include entries for the selected articles. Each one of the entries may include a link to one of the selected articles, an indicator based on the particular article type with which the selected article is annotated, and/or an identifier of a source (e.g., a name of a website/newspaper) of the selected article. When the particular type is the local-to-story type, annotation server 140 may determine the corresponding indicator based on the location of the user (e.g., geographic location of user device 110), as described further below in reference to FIG. 7.

In another embodiment, annotation server 140 may identify sets of articles that are responsive to the search query. Each one of the sets of articles may include one or more articles about a particular topic associated with the search query Annotation server 140 may select one or more articles that are stored in association/annotated with particular article types from one or more of the sets of articles. A quantity and the particular types of articles that are selected from different ones of the sets of articles may vary.

For example, annotation server 140 may identify a first set of articles about a first topic associated with a search query, a second set of articles about a second topic associated with the search query, a third set of articles about a third topic associated with the search query, etc. Annotation server 140 may select one or more articles for each topic. For example, for a first topic, annotation server 140 may select one article that is annotated with a most cited type, one article that is annotated with an in-depth type, etc. from the first set of articles. For a second topic, annotation server 140 may select one article that is annotated with an in-depth type, two articles that are annotated with a local-to-story type, etc. from the second set of articles. For a third topic, annotation server 140 may select one or more articles that are not annotated with any particular types from the third set of articles.

Annotation server 140 may generate an annotated result, for the sets of articles corresponding to each topic, based on the selected articles and the geographic location of the user. The annotated result may include groupings that correspond to the set of articles for a particular topic. A grouping may include entries for articles that are selected from a set of articles corresponding to the grouping and/or entries for articles that are in the set of articles but are not annotated with any particular types. Further to the example discussed above, annotation server 140 may generated an annotate result that includes a first grouping for the first set of articles, a second grouping for the second set of articles, and a third grouping for the third set of articles, etc.

Figure 6:
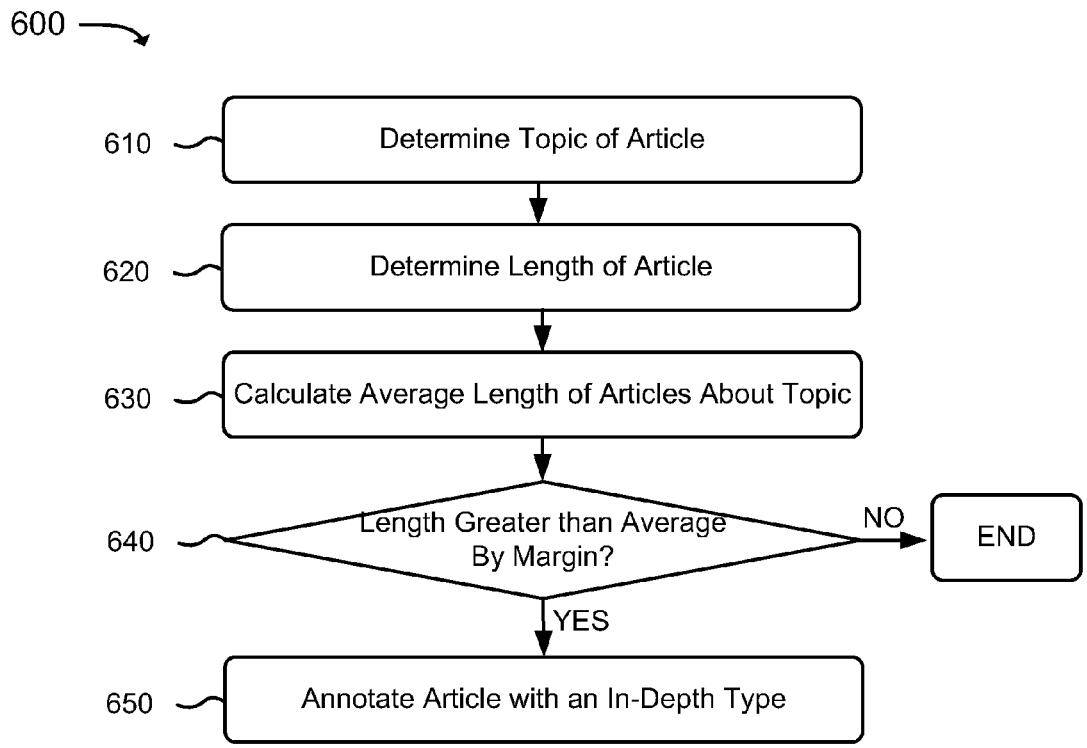
FIG. 6 is a flowchart illustrating an example process for annotating an article with an in-depth type.

As further shown in FIG. 6, the annotated result may be provided (block 460). For example, annotation server 140 may transmit the annotated result to search engine server 150. In one implementation, search engine server 150 may forward the annotated result to user device 110. User device 110 may display information included in the annotated result in the browser that the user of user device 110 used to enter the search query. In another implementation, search engine 150 may transmit formatted information based on the annotated result to user device 110. User device 110 may display the formatted information in the browser. The user may select a link to one of the articles listed in the annotated result based on the indicator associated with the one of the articles. User device 110 may, by using the link, retrieve one or more documents/web pages, associated with the one of the articles, from news data server 120.

Figure 5:
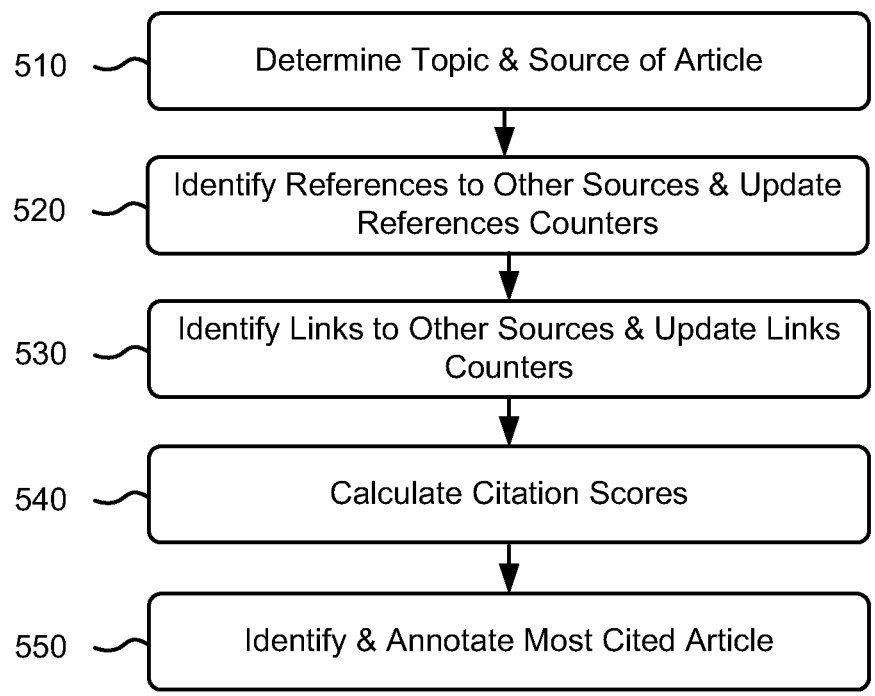
FIG. 5 is a flowchart illustrating an example process for annotating a most cited article.

FIG. 5 is a flowchart illustrating an example process 500 for annotating a most cited article. In one implementation, annotation server 140 may perform process 500. In other implementations, one or more other devices, separate from, or in combination with, annotation server 140, may perform some or all of process 500.

As shown in FIG. 5, process 500 may include determining a topic and a source of an article (block 510). For example, annotation server 140 may receive an article and any other relevant information from crawler server 130. Annotation server 140 may determine which topic(s) the article is about based on how crawler server 130 indexes documents and/or by using alternative algorithms. For example, annotation server 140 may determine topic(s) of an article based on proper nouns which are repeated more than a particular threshold of times. For example, a proper noun, mentioned in an article, is considered a topic when the proper noun is repeated more than X (e.g., 5) times and/or a quantity of times that the proper noun is repeated constitutes more than Y (e.g., 4%) of all words in the article. Annotation server 140 may also determine a source of the article based on a link to the article and/or content of the article. For example, annotation server 140 may determine that an article is from a particular newspaper associated with the link. However, annotation server 140 may determine, based on the content that the article is actually from a particular wire service Annotation server 140 may determine that the wire service is the source of the article.

References to other sources may be identified and references counters may be updated (block 520). For example, annotation server 140 may store a list of sources and alternative names used to refer to each one of the sources. Annotation server 140 may also store references counters. Each one of the references counters may indicate a quantity of articles/times that a particular source is referred to by/in articles about a particular topic. Annotation server 140 may identify which ones of the sources are mentioned in the text of the article Annotation server 140 may increase the references counters, for the topic of the article, of the identified sources. In other implementations, annotation server may only increase a references counter for a source when a name used for the source is used in combination with a particular phrase, such as "reports that," "according to," "reported by," broke the story," etc.

Links to other sources may be identified and links counters may be updated (block 530). For example, annotation server 140 may store addresses (e.g., URIs) associated with the sources on the list Annotation server 140 may also store links counters associated with the sources. Annotation server 140 may identify links within the article. For each one of the links, annotation server 140 may determine whether a link includes one of the URI addresses associated with a source. If the link includes one of the URI addresses associated with the source, annotation server 140 may increase a links counter associated with the source.

Citation scores may be calculated (block 540). For example, annotation server 140 may store citation scores associated with the sources on the list. Annotation server 140 may calculate a citation score, associated with a particular topic and a source, based on a references counter and a links counter associated with the particular topic and the source. In one implementation, the citation score may equal a sum (or some other function) of the references counter and the links counter. In another implementation, annotation server 140 may use an algorithm that weights, for example, the links counter differently than the references counter, to calculate the citation score.

A most cited article may be identified and annotated (block 550). For example, annotation server 140 may determine which source on the list of sources is associated with the highest citation score Annotation server 140 may identify an article from the source about the particular topic as the most cited article Annotation server 140 may annotate the article with a most cited type. Annotating the article, with the most cited type, may include storing an indication (or a link to an indicator), which specifies the most cited type, in association with the article (e.g., in the index).

FIG. 6 is a flowchart illustrating an example process 600 for annotating an article with an in-depth type. In one implementation, annotation server 140 may perform process 600. In other implementations, one or more other devices, separate from, or in combination with, annotation server 140, may perform some or all of process 600.

As shown in FIG. 6, process 600 may include determining a topic of an article (block 610). For example, annotation server 140 may determine topic(s) of an article received from crawler server 140, as described above with reference to block 510 of FIG. 5.

A length of the article may be determined (block 620). For example, annotation server 140 may determine a length of the article based on one or more factors. In one implementation, annotation server 140 may determine the length of the article based on a quantity of terms (e.g., words) included in the text/content of the article. In another implementation, annotation server 140 may determine the length of the article based on a quantity of links to other pages, associated with the article, in the HTML. For example, a magazine article may be divided into 4 separate pages by news data server 120 when an operator of news data server 120 posts the magazine article online. The HTML associated with a first page of the magazine article may include links to the other 3 pages at the bottom of the first page. Annotation server 140 may determine a length of "4" for the magazine article, which indicates that the length of the article is 4 pages. In yet another implementation, annotation server 140 may determine the length of the article based on an amount of data associated with the article and/or based on a size of a file associated with the article Annotation server 140 may calculate the amount of data, for example, based on quantity of lines of content (including images, text, etc.).

An average length of articles about a topic may be calculated (block 630). For example, annotation server 140 may store an average length of all articles that are about the determined topic Annotation server 140 may calculate the average length by calculating a sum of the lengths of all the articles about the topic and dividing the sum by a quantity of the articles about the topic. In another implementation, when calculating the average length, annotation server 140 may not include the lengths of any articles that are greater than a maximum threshold or less than a minimum threshold, to prevent a distortion of the average length. In yet another implementation, annotation server 140 may use a median length of all of the articles about the particular topic as the average length.

Process 600 may further include determining whether the length of the article is greater than the average length by a particular margin (block 640). For example, annotation server 140 may determine whether the length of the article is greater than the average length by a particular margin. The particular margin may equal a percentage, such as 10%. For example, the average length of the articles may equal "1000 terms" and the particular margin may equal "10%." Annotation server 140 may determine that the length of the article is greater than the average length by the particular margin when the length is greater than "1100 terms."

If the length of the article is greater than the average length by a particular margin (block 640-YES), process 600 may include annotating the article with an in-depth type (block 670). For example, when annotation server 140 determines that the length of the article is greater than the average length by the particular margin, annotation server 140 may annotate the article with an in-depth type. Annotating the article, with the in-depth type, may include storing an indication (or a link to an indicator), which specifies the in-depth type, in association with the article (e.g., in the index).

If the length of the article is not greater than the average length by the particular margin (block 640-NO), process 600 may end. Annotation server 140 may not annotate the article with the in-depth type.

In another implementation, annotation server 140 may annotate the article with the in-depth type when the length of the article is greater than a particular threshold. For example, annotation server 140 may annotate the article with the in-depth type only when the length of the article is greater than one or more particular thresholds (e.g., 2 pages, 4000 terms, etc.). In another example, annotation server 140 may annotate the article with the in-depth type only when the length of the article is greater than the average length and greater than the particular threshold. In yet another implementation, annotation server 140 may annotate an article with a longest article type when the length of the article is greater than the length of any other article. Annotation server 140 may also annotate an article with a particular type that indicates how long the article is in comparison to the other articles (e.g., annotation server 140 may annotate an article with a top quarter of longest articles type when the article is longer than, at least, 75% of the other articles).

Figure 7:
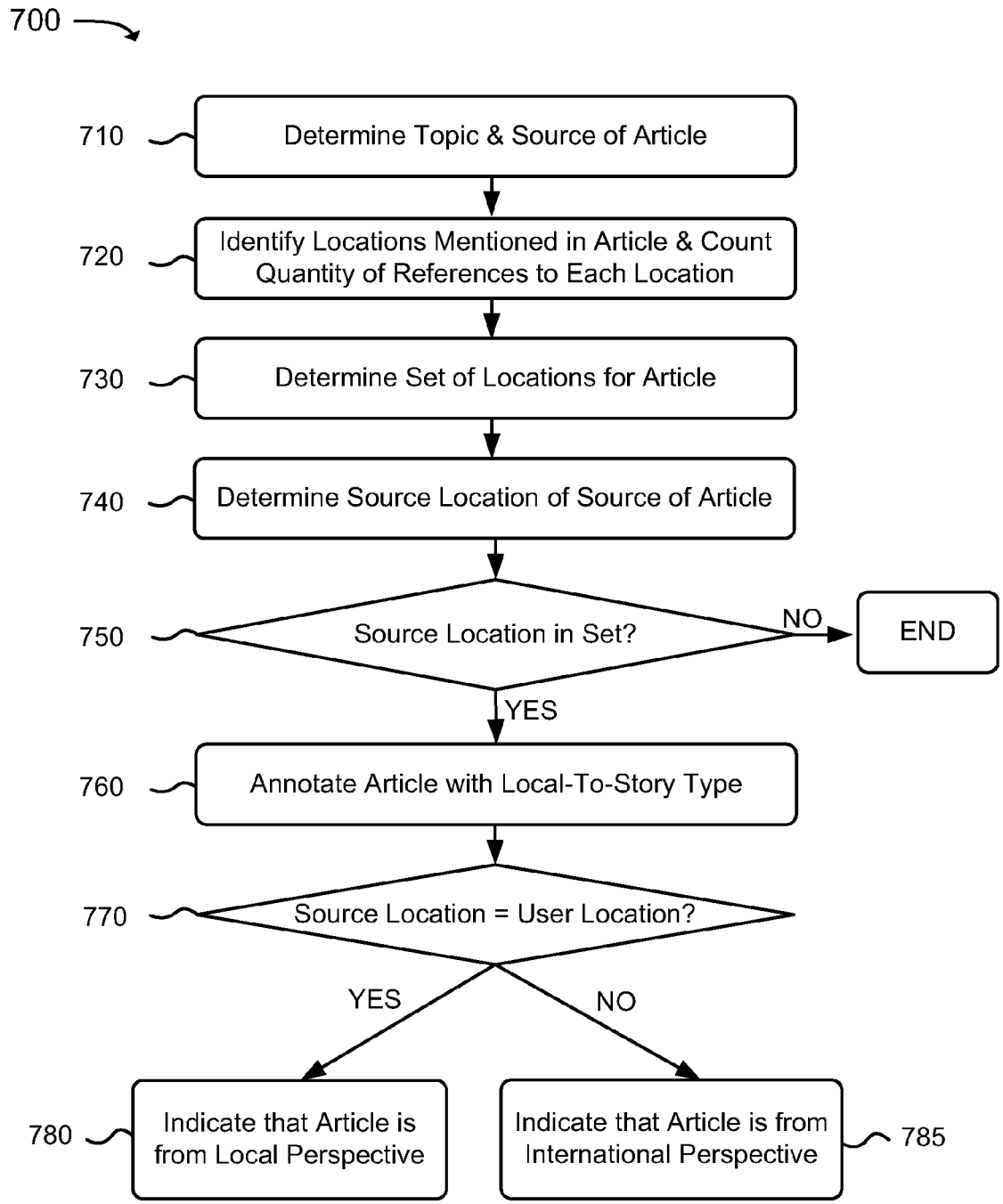
FIG. 7 is a flowchart illustrating an example process for indicating that an article is from a local perspective or an international perspective.

FIG. 7 is a flowchart illustrating an example process 700 for indicating that an article is from a local perspective or an international perspective. In one implementation, annotation server 140 may perform process 700. In other implementations, one or more other devices, separate from, or in combination with, annotation server 140, may perform some or all of process 700.

As shown in FIG. 7, process 700 may include determining a topic and a source of an article (block 710). For example, annotation server 140 may determine topic(s) and a source of an article, as described above with reference to block 510 of FIG. 5.

Locations mentioned in the article may be identified and a quantity of references to each location may be counted (block 720). For example, annotation server 140 may determine places (e.g., cities, states, countries, counties, towns, etc.) mentioned in the article Annotation server 140 may identify locations (e.g., countries) corresponding to those places. Annotation server 140 may consider each mention of a place as a reference to a location corresponding to the place. Annotation server 140 may count the quantity of references to each identified location in the article. For example, annotation server 140 may determine that the article references "India" 8 times, "Pakistan" 6 times, and "America" 1 time. In another implementation, annotation server 140 may use one or more available techniques for geo-coding an article.

A set of locations may be determined for the article (block 730). For example, annotation server 140 may determine a set of locations for the article. The set of locations may include one or more of the identified locations that are referenced a minimum number of times. In one implementation, annotation server 140 may select an identified location and determine whether a quantity of references to the identified location is greater than a particular threshold (e.g., 4) Annotation server 140 may include the identified location in the set of locations when the quantity of references to the identified locations is greater than the particular threshold Annotation server 140 may repeat the aforementioned process for each one of the identified locations in the article. Further to the example above, if the particular threshold equals 4, annotation server 140 may only include "India" and "Pakistan" in the set of locations for the article Annotation server 140 may not include "United States" in the set of locations because the quantity of times that "United States" is referenced in the article, 1, is less than the particular threshold of 4. In another implementation, annotation server 140 may include an identified location in the set of locations for the article when a quantity of references (e.g., 4) to the identified location is greater than a particular proportion (e.g., 0.25%) of a quantity of all the terms (e.g., 1000) in the article.

A source location of the source of the article may be determined (block 740). For example, when an operator of news data server 120 requests for an operator of crawler server 130 to index documents of news data server 120, the operator of news data server 120 may provide a location of the source associated with news data server 120. Annotation server 140 may store or have access to information about locations associated with the sources. Annotation server 140 may determine a source location of the source based on the information. For example, an operator of an Indian newspaper may specify that the source location of the Indian newspaper is India. In another implementation, annotation server 140 may determine the source location of the source based on location associated with a website of the source.

Process 700 may further include determining whether the source location is in the set of locations (block 750). For example, annotation server 140 may determine whether the source location is in the set of the locations associated with the article.

If the source location is in the set of locations (block 750-YES), process 700 may include annotating the article with a local-to-story type (block 760). For example, annotation server 140 may annotate the article with a local-to-story type when the source location is in the set of the locations associated with the article. The local-to-story type may indicate that the source location is mentioned one or more times in the article (e.g., that the article is about the same location as the source location).

If the source location is not in the set of locations (block 750-NO), process 700 may end. Annotation server 140 may not annotate the article with the local-to-story type.

Process 700 may also include determining whether the source location matches a user location (block 770). For example, after annotation server 140 receives a request from search engine server 150, annotation server 140 may determine a user location of user device 110, as, for example, described above in reference to block 440 of FIG. 4B. While generating an annotated result in response to the request, annotation server 140 may select the article that is annotated with the local-to-story type Annotation server 140 may determine whether the source location of the article matches the user location. In one implementation, the source location may match the user location when a country associated with the source location matches a country associated with the user location. The source location and/or the user location may equal the country or a place (e.g., a city) within the country. In another implementation, the source location may match the user location when the source location and the user location are associated with the same defined geographic area (e.g., a state, a city, a part of the country (e.g., East Coast of the United States), etc.). In yet another implementation, the source location may match the user location when the source location is within a predefined distance of the user location.

If the source location matches the user location (block 770-YES), process 700 may include indicating that the article is from a local perspective (block 780). For example, when the source location matches the user location, annotation server 140 may indicate that the article is from a local perspective Annotation server 140 may do so by including an indicator, in the annotated result, that specifies that the article is from the local perspective.

If the source location does not match the user location (block 770-NO), process 700 may include indicating that the article is from an international perspective (block 785). For example, when the source location does not match the user location, annotation server 140 may indicate that the article is from an international perspective Annotation server 140 may do so by including an indicator, in the annotated result, that specifies that the article is from the international perspective.

Figure 8:
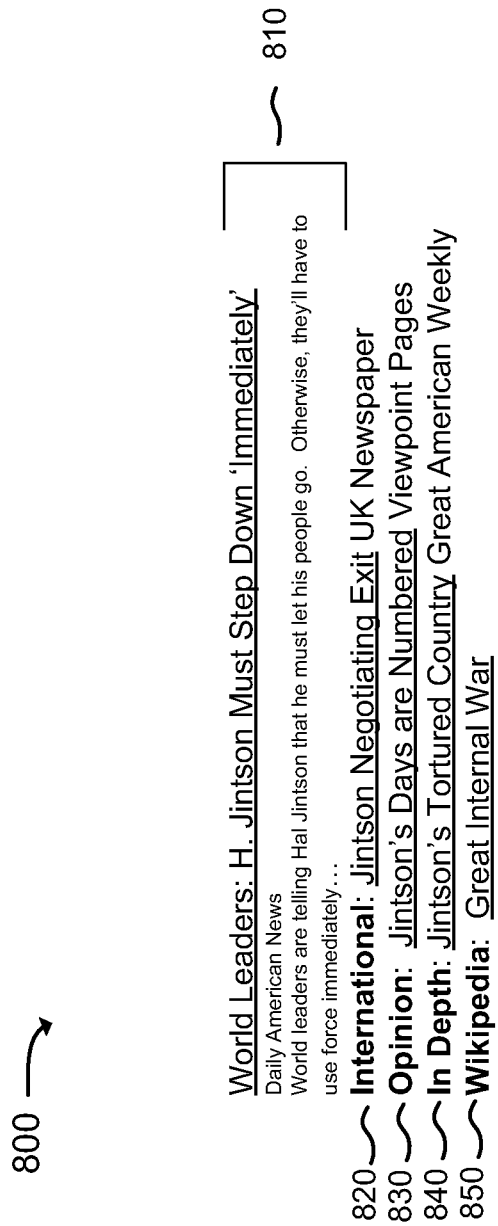
FIG. 8 illustrates an example user interface that displays information based on an annotated result.

FIG. 8 illustrates an example user interface 800 that displays information based on an annotated result. Assume that a user of user device 110, located in New York, enters a search query "Jintson" into a search engine. The user may select to view links to news articles related to "Jintson." User device 110 may transmit the search query to search engine server 150. Search engine server 150 may determine that user device 110 is in the United States of America (USA). Search engine server 150 may transmit the search query, "Jintson," and the location of user device 110, USA, to annotation server 140.

Annotation server 140 may identify, based on the search query, articles that are about "Jintson." Assume that annotation server 140 selects, from the identified articles, an article that is annotated with a most cited type, an article that is annotated with a local-to-story type, an article that is annotated with an opinion type, an article that is annotated with an in-depth type, and an article that is annotated with a name of a particular online encyclopedia (e.g., Wikipedia). Annotation server 140 may generate an annotated result based on the selected articles.

The annotated result may include entries corresponding to each one of the selected articles. Each entry may include a title of the article, a name of a source of the article, a link to the article, and an indicator based on the article type of the article. The indicator based on the most cited type may include instructions for displaying a reference to the article with a snippet, or summary, of the text of the article.

Annotation server 140 may determine an indicator, for the article that is annotated with the local-to-story type, based on the USA location of user device 110. For example, annotation server 140 may determine that a source of the article that is annotated with the local-to-story type is "UK Newspaper." Annotation server 140 may determine that "UK Newspaper" is a news source from the United Kingdom (UK). Because USA does not match UK, annotation server 140 may indicate via the indicator of the article that the article is from an international perspective. Annotation server 140 may transmit the annotated result to search engine server 150.

Search engine server 150 may generate HTML code for user interface 800 based on the annotated result. In another implementation, annotation server 140 may generate the annotated result in the HTML code. Search engine server 150 may transmit/forward the HTML code for the annotated result to user device 110. User device 110 may display the HTML code as user interface 800. User interface 800 may include, for example, an entry 810, an entry 820, an entry 830, an entry 840, and an entry 850.

As shown in FIG. 8, entry 810 may reference to the article that is annotated with the most cited type. Entry 810 may include a title of the article, a name of the source of the article (e.g., Daily American News), a part of the text of the article, and a link to the article. The user may select any part of entry 810 to select the link and access a web page of news data server 120 that displays the article. As shown in FIG. 8, entry 820 may reference to the article that is annotated with the local-to-story type. As shown in FIG. 8, entry 820 may include a title of the article, a name of the source of the article (e.g., UK Newspaper), an indicator (e.g., International), and a link to the article.

As shown in FIG. 8, entry 830 may reference to the article that is annotated with the opinion type. Entry 830 may include a title of the article, a name of the source of the article (e.g., Viewpoint Pages), an indicator (e.g., Opinion), and a link to the article. As shown in FIG. 8, entry 840 may reference to the article that is annotated with the in-depth type. Entry 840 may include a title of the article, a name of the source of the article (e.g., Great American Weekly), an indicator (e.g., In Depth), and a link to the article.

As shown in FIG. 8, entry 850 may reference to the article that is annotated with the name of the particular online encyclopedia. Entry 850 may include a title of an entry in the particular online encyclopedia that includes a citation to the article (e.g., Great Internal War), a name of the particular online encyclopedia (e.g., Wikipedia), and a link to the entry.

The user may select any one of entries 810-850 to access a web page associated with the selected entry. For example, assume that the user is interested in reading a long article about "Jintson." The user may select a part of entry 840 to access a web page of news data server 120 that includes the (long) article that is annotated with the in-depth type.

Figure 9:
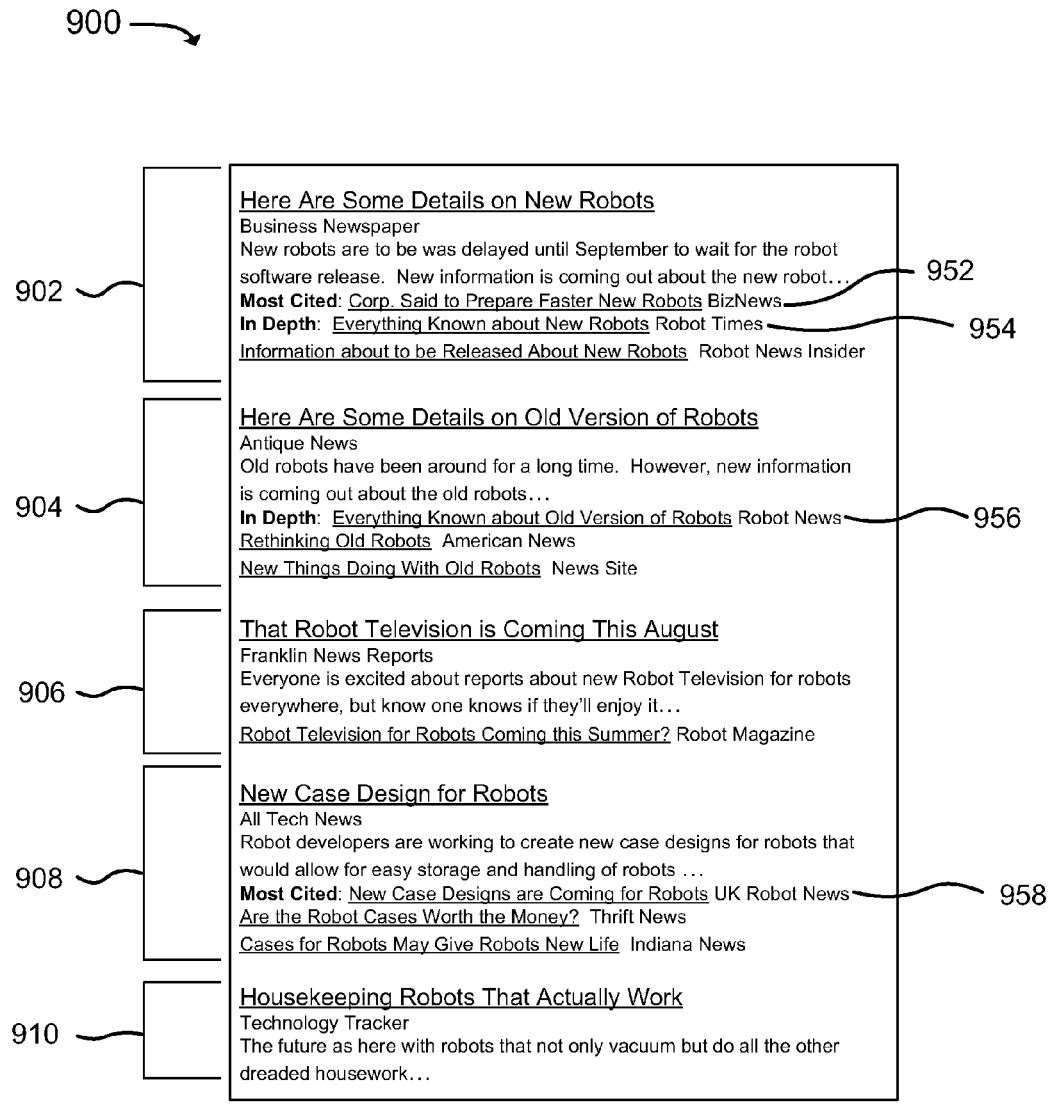
FIG. 9 illustrates another example user interface that displays information based on another annotated result.

FIG. 9 illustrates an example user interface 900 that displays information based on an annotated result that includes groupings that correspond to multiple sets of articles. Assume that a user of user device 110 enters a search query "Robots" into a search engine. The user may select to view links related to "Robots." User device 110 may transmit the search query to search engine server 150. Search engine server 150 may transmit the search query, "Robots," to annotation server 140.

Annotation server 140 and/or search engine server 150 may identify, based on the search query, a first set of articles about a first topic (e.g., new Robots) associated with "Robots," a second set of articles about a second topic (e.g., old Robots) associated with "Robots," a third set of articles about a third topic (e.g., television service for Robots) associated with "Robots," a fourth set of articles about a fourth topic (e.g., cases for Robots) associated with "Robots," and a fifth set of articles about a fifth topic (e.g., housekeeping Robots) associated with "Robots."

Assume that annotation server 140 selects, from the first set of articles, four different articles, including one article that is annotated with a most cited type (e.g, "Most Cited") and one article that is annotated with an in-depth type (e.g., "In Depth"). Assume that annotation server 140 selects, from the second set of articles, four different articles, including one article that is annotated with an in-depth type (e.g., "In Depth"). Assume that annotation server 140 selects, from the third set of articles, two different articles, none of which are annotated with any types. Annotation server 140 selects, from the fourth set of articles, four different articles, including one article that is annotated with a most cited type (e.g., "Most Cited"). Assume that annotation server 140 selects, from the fifth set of articles, a single article, which is the only article in the sixth set of articles and which is not annotated with any type.

Annotation server 140 may generate an annotated result, for the five sets of articles corresponding to the five topics, based on the selected articles. The annotated result may include groupings 902-910 that correspond to the sets of articles for a particular topic. Groupings 902-910 may include entries for articles that are selected from each set corresponding to one of groupings 902-910.

For example, grouping 902 may include four entries for the four articles that are selected from the first set, including an entry 952 for the article that is annotated with the most cited type (e.g, "Most Cited") and an entry 954 for the article that is annotated with the in-depth type (e.g., "In Depth"). Grouping 904 may include four entries for the four articles that are selected from the second set, including an entry 956 for the article that is annotated with the in-depth type (e.g., "In Depth"). Grouping 906 may include two entries for the two articles that are selected from the third set, none for articles which are annotated. Grouping 908 may include four entries for the four articles that are selected from the fourth set, including an entry 958 for the article that is annotated with the most cited type (e.g, "Most Cited"). Grouping 910 may include a single entry for the single article that is selected the fifth set of articles.

Annotation server 140 may transmit the annotated result to search engine server 150. Search engine server 150 may generate HTML code for user interface 900 based on the annotated result. The HTML code may include code to represent groupings 902-910. Search engine server 150 may transmit/forward the HTML code for the annotated result to user device 110. User device 110 may display the HTML code as user interface 900. User interface 900 may include groupings 902-910.

As shown in FIG. 9, grouping 902 includes entry 952 and entry 954, which reference an article that is annotated with the most cited type and an article that is annotated with the in-depth type, respectively. Grouping 904 includes entry 956, which references an article that is annotated with the in-depth type. Grouping 908 includes entry 958, which references an article that is annotated with the most cited type. Groupings 906 and 910 do not include any entries which reference any articles that are annotated with any types.

The user may select any one of entries 952-958 to access a web page associated with an article that is annotated with a particular type. For example, assume that the user is interested in reading a long article about "Old Robots." The user may select a part of entry 956 to access a web page of news data server 120 that includes the (long) article that is annotated with the in-depth type.

An annotation server may annotate articles with article types that specify information about the articles. A user may select one of the articles based on an article type with which the one of the articles is annotated.

The foregoing description provides illustration and description, but is not intended to be exhaustive or to limit the embodiments to the precise form disclosed. Modifications and variations are possible in light of the above teachings or may be acquired from practice of these embodiments.

For example, while series of blocks have been described with regard to FIGS. 4-7, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   identifying, by at least one of the one or more server devices, an article about a topic;
   determining, by at least one of the one or more server devices, a set of geographic locations for the article, where the set of geographic locations comprises one or more geographic locations mentioned in the article;
   determining, by at least one of the one or more server devices, a source of the article;
   determining, by at least one of the one or more server devices, a geographic location associated with the source of the article;
   determining, by at least one of the one or more server devices, whether the geographic location, of the source of the article, is included in the set of geographic locations; and
   specifying, by at least one of the one or more server devices, a type, of the article, as a particular type when the geographic location, of the source of the article, is included in the set of geographic locations, where the particular type specifies that the article is related to the geographic location.

2. The method of claim 1, further comprising:
   receiving, from a user device, a search query relating to the topic and information regarding a geographic location of the user device;
   obtaining the article based on the search query;
   generating, based on the geographic location of the user device, an annotated result associated with the article, where the annotated result comprises a link to the article and an indicator based on the type of the article; and
   providing the annotated result for display on the user device.

3. The method of claim 2, further comprising:
   determining whether the geographic location, of the user device, matches the geographic location of the source of the article,
      where the indicator specifies that the article is from a local perspective when the article is of the particular type and the geographic location, of the user device, matches the geographic location of the source of the article, and
      where the indicator specifies that the article is from an international perspective when the article is of the particular type and the geographic location, of the user device, does not match the geographic location of the source of the article.

4. The method of claim 2,
   where the indicator indicates whether the geographic location, of the user device, matches the geographic location of the source of the article, and
   where the geographic location, of the user device, matches the geographic location of the source of the article when a country associated with the geographic location of the user device matches a country associated with the geographic location of the source of the article.

5. The method of claim 1, further comprising:
   identifying a second article about the topic; and
   annotating the second article, based on a content of the second article, to specify a second type of the second article, where the second type of the second article is different from the type of the article.

6. The method of claim 1, where determining the set of geographic locations comprises:
   determining a place mentioned in the article,
   determining a first geographic location corresponding to the place,
      where the first geographic location is one of the one or more geographic locations mentioned in the article,
   counting a quantity of references to the first geographic location in the article, and
   including the first geographic location in the set of geographic locations when the quantity of references is greater than a particular threshold.

7. A non-transitory computer-readable medium containing instructions, the instructions comprising:
   one or more instructions which, when executed by at least one processor, cause the at least one processor to receive a first article that is retrieved from a first server;
   one or more instructions which, when executed by the at least one processor, cause the at least one processor to determine whether the first article satisfies first criteria based on content of the first article;

one or more instructions which, when executed by the at least one processor, cause the at least one processor to annotate the first article with a first article type when the first article satisfies the first criteria;
one or more instructions which, when executed by the at least one processor, cause the at least one processor to determine whether the first article satisfies second criteria based on information, other than the content of the first article, that is associated with the first article,
where the information, that is associated with the first article, comprises a quantity of times that the first article is shared by particular users via one or more particular online applications;
one or more instructions which, when executed by the at least one processor, cause the at least one processor to annotate the first article with a second article type when the first article satisfies the second criteria,
where the second article type is different from the first article type,
where the first article satisfies the second criteria when the quantity of times is greater than a quantity of times that another article about a topic of the article is shared, and
where the second article type indicates that the quantity of times that the article is shared is greater than the quantity of times that the other article about the topic is shared; and
store the first article in association with the topic of the article and at least one of the first article type or the second article type.

8. The non-transitory computer-readable medium of claim 7, the instructions further comprising:
one or more instructions which, when executed by the at least one processor, cause the at least one processor to receive a second article about the topic,
where the second article is retrieved from a second server, and
where the second server is associated with a news website;
annotate the second article with the first article type when the second article satisfies the first criteria;
annotate the second article with the second article type when the second article satisfies the second criteria; and
store the second article in association with the topic and at least one of the first article type or the second article type.

9. The non-transitory computer-readable medium of claim 7,
where the content of the first article comprises at least one of a title of the first article, a link to the first article, or text of the first article, and
where the first article type is at least one of an opinion type, a satire type, or a live coverage type.

10. The non-transitory computer-readable medium of claim 7,
where the information that is associated with the first article further comprises a length of the first article,
where the first article satisfies third criteria when the length of the first article is greater than a particular length,
where the particular length is equal to or greater than an average length of other articles about the topic, and
where the instructions further comprise:
one or more instructions to annotate the first article with a third article type that indicates that the length of the first article is greater than the average length of the other articles about the topic.

11. The non-transitory computer-readable medium of claim 10, where the length of the first article is based on at least one of a quantity of terms in text of the article, a quantity of links to other pages associated with the article, an amount of data associated with the first article, or a size of a file associated with the first article.

12. The non-transitory computer-readable medium of claim 7, where the information that is associated with the first article comprises:
a geographic location of a source of the article, and
a set of geographic locations for the article,
where the set of geographic locations comprises one or more geographic locations mentioned in the article.

13. The non-transitory computer-readable medium of claim 12,
where the first article satisfies third criteria when the geographic location, of the source of the article, is included in the set of geographic locations, and
where the instructions further comprise:
one or more instructions to annotate the first article with a third article type that indicates that the geographic location, of the source of the first article, matches one of the one or more geographic locations mentioned in the article.

14. The non-transitory computer-readable medium of claim 7,
where the information that is associated with the first article comprises a source of the first article, and
where the first article satisfies third criteria when the source of the first article matches a name on a list of sources associated with a third article type.

15. The non-transitory computer-readable medium of claim 7,
where the information that is associated with the first article comprises a score that indicates a level of citation of the first article or of a source of the first article by one or more other articles about the topic,
where the first article satisfies third criteria when the score is greater than citation scores associated with the other articles, and
where the instructions further comprise:
one or more instructions to annotate the first article with a third article type that indicates that the first article is cited more than the other articles about the topic.

16. The non-transitory computer-readable medium of claim 15,
where the level of citation comprises references to the source or to the first article and links to the first article, and
where the score is based on a quantity of the references and a quantity of the links.

17. A server device comprising:
a memory to store articles; and
a processor to:
receive a search query,
select a first article, of the articles, that is responsive to the search query and is stored in association with a first particular article type that describes content of the first article,
select a second article, of the articles, that is responsive to the search query and is stored in association with a second particular article type that describes a type of the second article,
where the first particular article type is different from the second particular article type, the second article being associated with the second particular article type based on the second article satisfying criteria,
 the second article satisfying the criteria based on a citation score, associated with the second article, being greater than citation scores associated with other articles,
  the citation score indicating a level of citation of the second article or of a source of the second article by one or more other articles about a topic of the second article,
generate an annotated result based on the first article and the second article,
 where the annotated result comprises:
  a first link to the first article,
  a first visual indicator that identifies the first particular article type,
  a second link to the second article, and
  a second visual indicator that identifies the second particular article type,
   the second particular article type indicating that the second article is cited more than at least one other article about the topic, and
provide the annotated result for display.

18. The server device of claim 17, where at least one of the first particular article type or the second particular article type is one of:
an opinion type,
a satire type, or
an in-depth article type that indicates that a length of the first article is greater than an average length of the other articles about the topic.

19. The server device of claim 17,
where the second particular article type specifies that the second article is about a first geographic location that is associated with a source of the second article,
where the processor is further to:
 receive information regarding a second geographic location of a user device, and
 determine whether the first geographic location matches the second geographic location,
where the second visual indicator specifies that the second article is from a local perspective when the first geographic location matches the second geographic location, and
where the second visual indicator specifies that the second article is from an international perspective when the first geographic location does not match the second geographic location.

20. The server device of claim 17,
where, when selecting the first article, the processor is further to:
 select a first quantity of articles that are responsive to the search query and are stored in association with the first particular article type,
where the first article is one of the first quantity of articles,
where, when selecting the second article, the processor is further to:
 select a second quantity of articles that are responsive to the search query and are stored in association with the second particular article type,
where the second article is one of the second quantity of articles, and
where the first quantity is different from the second quantity.

21. The server device of claim 17,
where the second article satisfies other criteria based on a length of the second article being greater than a particular length,
where the particular length is equal to or greater than an average length of other articles about the topic, and
where the second article is associated with a third particular article type that indicates that the length of the second article is greater than the average length of the other articles about the topic.

* * * * *